Figure 1:
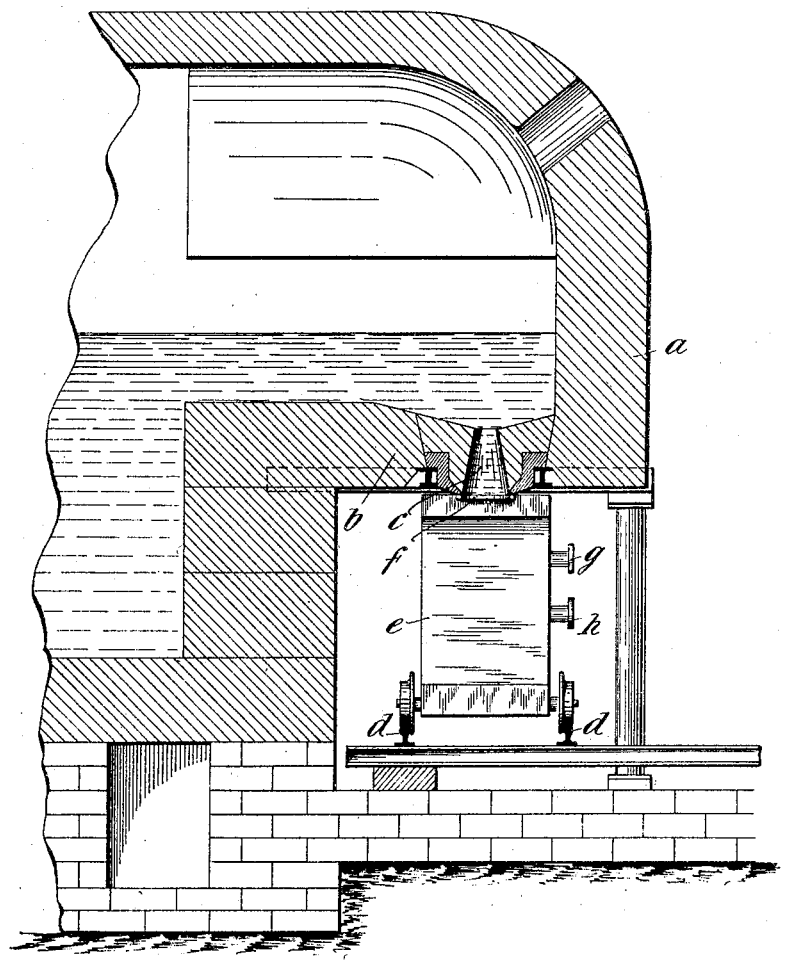

No. 796,513. PATENTED AUG. 8, 1905.
H. HILDE.
GLASS MELTING FURNACE.
APPLICATION FILED MAR. 15, 1904.

2 SHEETS—SHEET 1.

WITNESSES:

INVENTOR:

No. 796,513. PATENTED AUG. 8, 1905.
H. HILDE.
GLASS MELTING FURNACE.
APPLICATION FILED MAR. 15, 1904.
2 SHEETS—SHEET 2.
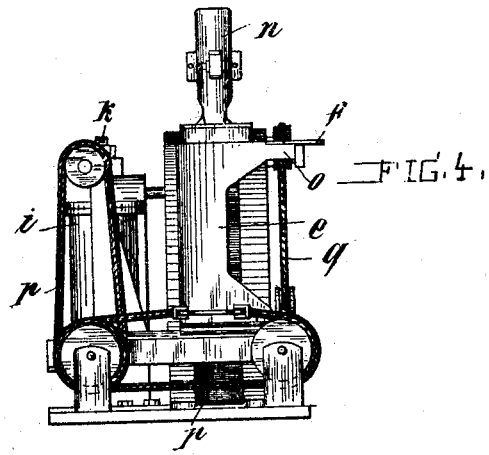
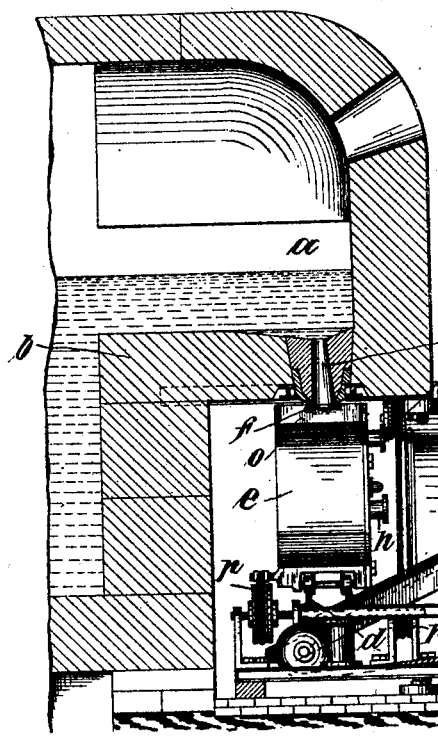
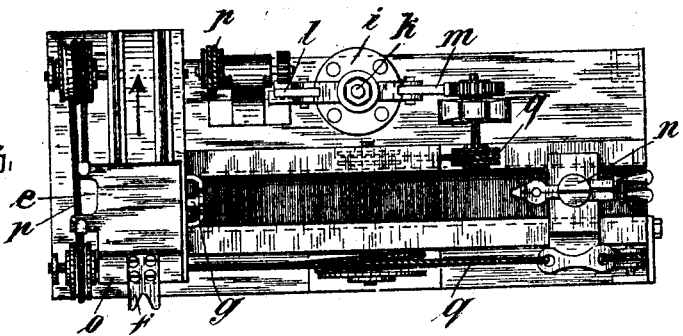
WITNESSES:
W. Rabniber
L. Staaden
INVENTOR:
Hermann Hilde,
by Alfred Miller,
Atty.

UNITED STATES PATENT OFFICE.

HERMANN HILDE, OF ROSSWEIN, GERMANY.

GLASS-MELTING FURNACE.

No. 796,513.      Specification of Letters Patent.      Patented Aug. 8, 1905.

Application filed March 15, 1904. Serial No. 198,212.

*To all whom it may concern:*

Be it known that I, HERMANN HILDE, a subject of the King of Prussia, German Emperor, residing at Rosswein, in the Kingdom of Saxony, German Empire, have invented certain new and useful Improvements in Glass-Melting Furnaces, of which the following is a specification.

My invention relates to improvements in furnaces for melting glass, whereby the glass may be more conveniently and rapidly removed from the furnace and fed to the glass-blowing machines, presses, or the like, the glass being at the same time always pure.

It is essential according to this invention that the glass is taken from the furnace direct through a suitable outlet, and my improvements relate essentially to the arrangement of a closable outlet, channel, or conduit normally closed by a special closing device and carried through the furnace-wall at such distance from the surface of the fluid-glass mass that on opening the said closing device pure glass is always delivered automatically. This arrangement for obtaining pure glass presents a material advantage over prior systems of furnaces in which the glass is delivered from the top of the furnace. Other advantages offered are that waste is avoided, the glass is delivered more rapidly for subsequent working, and labor is economized.

My invention is illustrated in the accompanying drawings, in which—

Figure 1 is a vertical section of a portion of a glass-furnace to which my improvements have been applied. Fig. 2 is a similar view of a portion of a furnace, showing apparatus for mechanically transporting the liquefied glass in a transporting vessel or a mold from the furnace to the place of delivery. Fig. 3 is a plan of the apparatus shown in Fig. 2, the furnace itself being omitted; and Fig. 4 is an end elevation of the apparatus shown in Fig. 3.

The furnace is built with an overhanging or projecting portion $a$, in the floor $b$ of which an outlet or delivery channel $c$, preferably of a slightly-conical shape, is provided. The outlet $c$ in the form of construction shown in Fig. 1 is closed by a block $e$, running on rails $d$. When glass is to be run out of the furnace, the block $e$ must be pushed aside and the mold or other transport vessel which is to receive the glass from the furnace brought below the outlet $c$. When the mold has been fully charged, it must be removed and the block $e$ wheeled into its original position below the aperture $c$. In moving up this position its knife $f$ with shear action will cut off the rope of glass hanging from the hole $c$, whereupon the block $e$ assumes its initial position below the aperture $c$, thus closing the latter. To prevent overheating of the block, it is made hollow and provided with flange-pipes $g$ $h$ for attaching thereto conduits, whereby a stream of cold water or other cooling agent may be caused to circulate through it when in use.

In the modification shown in Fig. 2 the block $e$, cooled as before by a suitable agent, is arranged in the manner of a slide, being actuated by the pneumatic machine $i$. On the piston of this machine reciprocating the racks $l$ $m$, rigidly connected with the piston-rod $k$, transport both the block $e$ and the mold $n$, so that at each up-and-down motion of the piston the block $e$ is half-retreated, the mold $n$ simultaneously run down and introduced below the outlet $c$, and the block $e$ thereupon wholly retreated, so that it is only now that its nose $o$ uncovers the hole $c$ and allows the glass to run into the mold $n$. The block $e$ and mold $n$ are transported by the machine $i$ by means of driving-ropes $p$ $q$.

What I claim as my invention, and desire to secure by Letters Patent, is—

1. The combination, in a glass-melting furnace, of a projecting portion $a$, having an outlet $c$ in its bottom, with a block $e$ running on rails and adapted to normally keep the said outlet closed, essentially as set forth.

2. The combination, in a glass-melting furnace, of a projecting portion $a$, having an outlet $c$ in its bottom, with a block $e$ running on rails and adapted to normally keep the said outlet closed, said block having flange-pipes $g$ $h$ for attaching thereto the conduit for a cooling agent to circulate through the block and further having a horizontal knife $f$ on its top for cutting off the glass at the outward run of the block, essentially as set forth.

In testimony whereof I have signed my name to this specification in the presence of two subscribing witnesses.

HERMANN HILDE.

Witnesses:
    CARL GARZ,
    FRIEDRICH WEGNER.